United States Patent
Yamamoto et al.

(10) Patent No.: US 6,313,586 B1
(45) Date of Patent: Nov. 6, 2001

(54) CONTROL APPARATUS CAPABLE OF IMPROVING A RISE TIME CHARACTERISTIC OF A LIGHT SOURCE

(75) Inventors: Tetsuichiro Yamamoto, Tokyo; Tatsuya Shimizu, Muko; Yutaka Okazaki, Osaka, all of (JP)

(73) Assignees: NEC Corporation, Tokyo; Murata Manufacturing Co., Ltd., Kyoto-fu, both of (JP)

( * ) Notice: Subject to any disclaimer, the term of this patent is extended or adjusted under 35 U.S.C. 154(b) by 0 days.

(21) Appl. No.: 09/538,782

(22) Filed: Mar. 30, 2000

(30) Foreign Application Priority Data

Mar. 30, 1999 (JP) .................................................. 11-087675

(51) Int. Cl.⁷ .................................................... H05B 37/02
(52) U.S. Cl. .......................... 315/224; 315/307; 315/149; 315/158
(58) Field of Search .................................... 315/149, 157, 315/158, 159, 307, 224; 399/32, 51, 118, 177, 220; 355/67, 68, 69

(56) References Cited

U.S. PATENT DOCUMENTS 5,198,909 * 3/1993 Ogiwara et al. ...................... 358/412
5,907,742 * 5/1999 Johnson et al. ......................... 399/51
6,069,448 * 5/2000 Yeh ....................................... 315/149

* cited by examiner

Primary Examiner—Haissa Philogene
(74) Attorney, Agent, or Firm—Ostrolenk, Faber, Gerb & Soffen, LLP

(57) ABSTRACT

An image input apparatus comprises a cold cathode tube light source and a solid imaging device. The image input apparatus reads an image from a document paper by receiving at the solid imaging device a reflected light which is obtained by reflecting a light of the cold cathode tube light source on the document paper. On putting cold cathode tube light source into an on-state, an inverter control circuit controls an inverter to make the inverter supply the cold cathode tube light source with an overcurrent higher than a predetermined tube current which is for use in continuously and stably irradiating a predetermined luminous energy from the cold cathode tube light source. After the overcurrent is applied to the cold cathode tube light source during a predetermined duration, the inverter control circuit controls the inverter to make the inverter reduce the overcurrent to a predetermined current in accordance with an output of the solid imaging device.

5 Claims, 2 Drawing Sheets

CONTROL APPARATUS CAPABLE OF IMPROVING A RISE TIME CHARACTERISTIC OF A LIGHT SOURCE

BACKGROUND OF THE INVENTION

This invention relates to a control apparatus for controlling a light source and, more particularly, to a control apparatus for controlling a luminous energy of the light source in an image input apparatus.

In general, an image input apparatus is provided with a cold-cathode tube light source (CCFL) and a read-in solid imaging device (CCD). In the image input apparatus, the CCFL irradiates a light to a document paper in order to read the image from the document paper by the CCD. On reading the image from the document paper by the CCD, it is necessary to properly control a luminous energy of the CCFL.

When the CCFL is put into an on-state in a conventional image input apparatus, the luminous energy reaches a predetermined energy in the CCFL after a predetermined time lapses. After the luminous energy reaches the predetermined energy in the CCFL, the conventional image input apparatus starts to read the image from the document paper by the CCD to obtain the image. More particularly, a time duration lapse needs until the luminous energy reaches the predetermined energy in the CCFL after the CCFL is put into an on-state. The time duration lapse will be called a rise time. The rise time is determined on the basis of a characteristic of CCFL. As described above, the conventional image input apparatus starts to read the image from the document paper by the CCD after the luminous energy is stabilized.

As described above, it is necessary to start to read the image from the document paper in the conventional image input apparatus after the luminous energy is stabilized in CCFL. In other words, it is impossible to start to read the image from the document paper in the conventional image input apparatus until the luminous energy is stabilized in CCFL. As a result, a user must wait to read the image from the document paper after the luminous energy is stabilized in CCFL.

In order to read the image from the document paper at once after the CCFL is put into the on-state, an environmental temperature of the CCFL may be kept at a predetermined temperature. More particularly, the environmental temperature of the CCFL is controlled to the predetermined temperature by a heater system. However, a waiting or stand-by consumption power increases when the environmental temperature of the CCFL is controlled to the predetermined temperature by the heater system.

Furthermore, a fluorescent tube may be used as the light source instead of the CCFL. The fluorescent tube is constituted by only an inert gas and does not contain mercury or the like having a high dependency on a tube temperature. When the fluorescent tube is used as the light source instead of the CCFL, it is difficult to obtain a sufficient luminous energy although a rise time characteristic is improved.

SUMMARY OF THE INVENTION

It is an object of this invention to provide a light source control unit capable of obtaining a sufficient luminous energy without increasing a stand-by consumption power.

It is another object of this invention to provide a light source control unit capable of improving a rise time characteristic without increasing a stand-by consumption power.

Other objects of this invention will become clear as the description proceeds.

On describing the gist of this invention, it is possible to understand that a light source control apparatus is for use in an image input apparatus comprising a cold cathode tube light source and a solid imaging device. The image input apparatus reads an image from a document paper by receiving at the solid imaging device a reflected light which is obtained by reflecting a light of the cold cathode tube light source on the document paper.

According to this invention, the light source control apparatus comprises control means for, in accordance with a feedback signal, controlling a current as a tube current which is applied to the cold cathode tube light source and feedback means for feeding back an output of the solid imaging device as the feedback signal to the control means.

DESCRIPTION OF THE PREFERRED EMBODIMENTS

Figure 1:
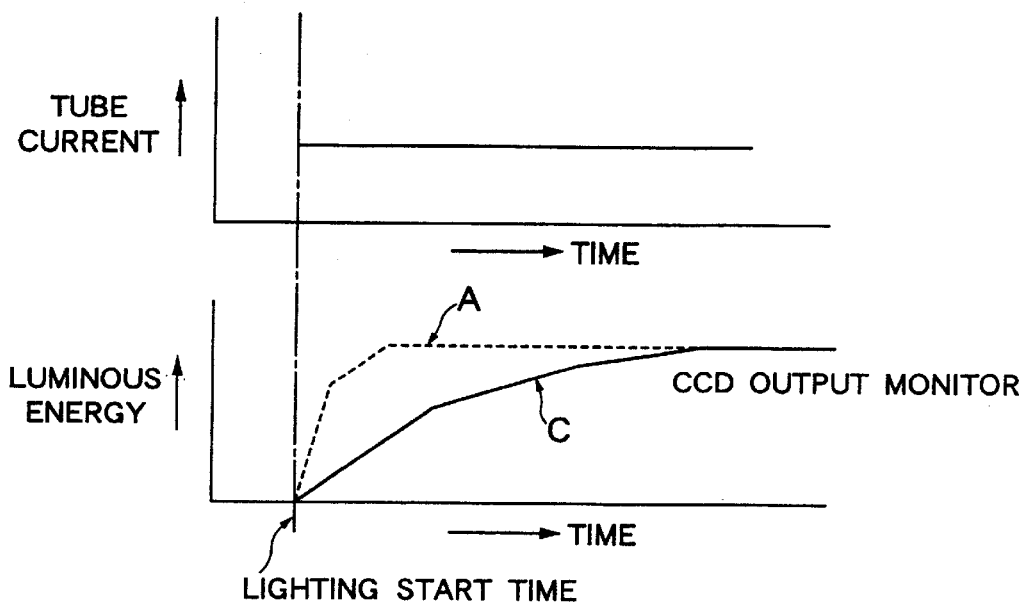
FIG. 1 shows a view for describing a conventional light source control.

Referring to FIG. 1, description will first be made as regards a conventional image input apparatus for a better understanding of this invention. The image input apparatus is provided with a cold-cathode tube light source (CCFL) and a read-in solid imaging device (CCD). In the image input apparatus, the CCFL irradiates a light to a document paper in order to read the image from the document paper by the CCD. On reading the image from the document paper by the CCD, it is necessary to properly control a luminous energy of the CCFL.

When the CCFL is put into an on-state in a conventional image input apparatus, the luminous energy reaches a predetermined energy in the CCFL after a predetermined time lapse. After the luminous energy reaches the predetermined energy in the CCFL, the conventional image input apparatus starts to read the image from the document paper by the CCD to obtain the image. More particularly, a time duration lapse needs until the luminous energy reaches the predetermined energy in the CCFL after the CCFL is put into an on-state. The time duration lapse will be called a rise time. The rise time is determined on the basis of a characteristic of CCFL. As described above, the conventional image input apparatus starts to read the image from the document paper by the CCD after the luminous energy is stabilized.

More specifically, a predetermined tube current is applied to the CCFL at a lighting start time instant. As described above, the luminous energy is stabilized after the predetermined time duration lapses as show by a dot line A in FIG. 1 inasmuch as the CCFL has a rise time characteristic. As shown by a solid line C in FIG. 1, a CCD output becomes a constant after the luminous energy is stabilized and thereafter a time further lapses.

As described above, it is necessary to start to read the image from the document paper in the conventional image input apparatus after the luminous energy is stabilized in CCFL. In other words, it is impossible to start to read the image from the document paper in the conventional image input apparatus until the luminous energy is stabilized in CCFL. As a result, a user must wait to read the image from the document paper after the luminous energy is stabilized in CCFL.

In order to read the image from the document paper at once after the CCFL is put into the on-state, an environmental temperature of the CCFL may be kept at a predetermined temperature. More particularly, the environmental temperature of the CCFL is controlled to the predetermined temperature by a heater system. However, a waiting or stand-by consumption power increases when the environmental temperature of the CCFL is controlled to the predetermined temperature by the heater system.

Furthermore, a fluorescent tube may be used as the light source instead of the CCFL. The fluorescent tube is constituted by only an inert gas and does not contain mercury or the like having a high dependency on a tube temperature. When the fluorescent tube is used as the light source instead of the CCFL, it is difficult to obtain a sufficient luminous energy although a rise time characteristic is improved.

Figure 2:
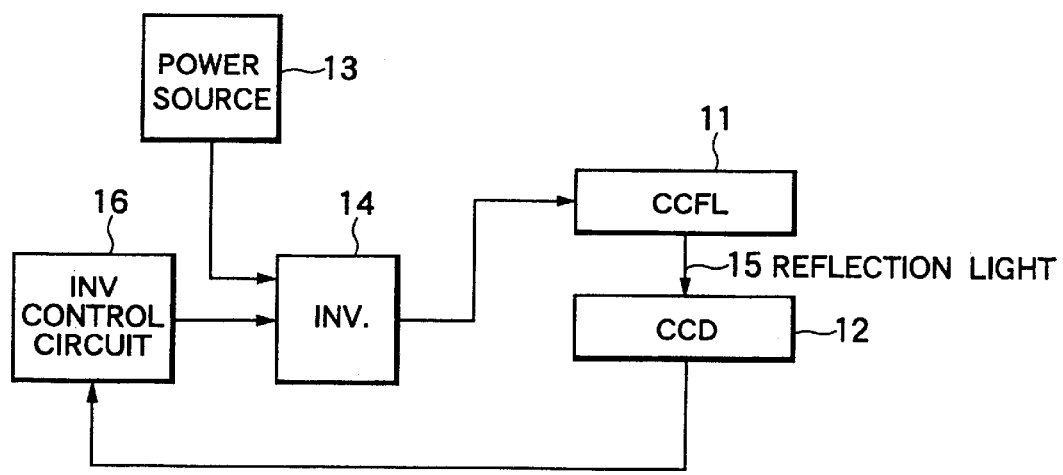
FIG. 2 is a block diagram of a light source control apparatus according to a first embodiment of this invention.

Referring to FIG. 2, description will proceed to a light source control apparatus according to a first embodiment of this invention. As described in conjunction with FIG. 1, an image input apparatus is provided with a cold-cathode tube light source (CCFL) 11 and a read-in solid imaging device (CCD) 12. A light source control apparatus controls the CCFL 11 as will be described later. On reading an image from a document paper, a tube current is applied from a power source 13 to the CCFL 11 through an inverter (INV) 14. The light of the CCFL 11 is reflected upon the document paper (not shown) to be supplied as a reflection light 15 to the CCD 12. As a result, the CCD 12 outputs an image read-in signal.

The light source control apparatus comprises an inverter control circuit (INV control circuit) 16. The image read-in signal is fed back as a feedback signal to the INV control circuit 16. The INV control circuit 16 controls the INV 14 in accordance with the feedback signal.

Figure 3:
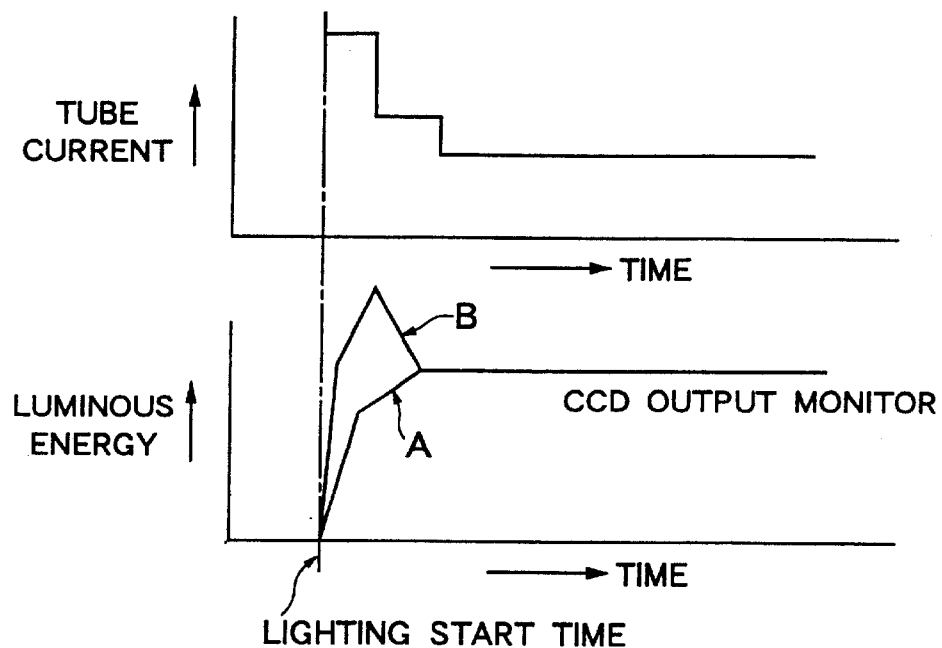
FIG. 3 shows a view for describing an operation of the light source control apparatus illustrated in FIG. 2.

Referring to FIG. 3 in addition to FIG. 2, it will be assumed that a predetermined tube current is represented by Ic which is applied to the CCFL 11. When the tube current Ic is applied to the CCFL 11, the CCFL 11 continuously and stably lights to irradiate a predetermined luminous energy. At a lighting start time, the INV control circuit 16 controls the INV 14 to apply a predetermined overcurrent Io as the tube current to the CCFL 11. Incidentally, Io>Ic. As a result, the tube temperature of the CCFL 11 is promptly increased. Immediate rise is made to a region that the gas inside the CCFL 11 is stably lit.

When the overcurrent Io is applied as the tube current to the CCFL 11 as described above, the feedback signal is supplied from the CCD 12 to the INV control circuit 16. The INV control circuit 16 monitors the feedback signal to obtain a monitoring result. The INV control circuit 16 controls the INV 14 in accordance with the monitoring result. In other words, the INV control circuit 16 controls the tube current.

More particularly, the INV control circuit 16 controls the INV 14 at a time that the luminous energy reaches a predetermined level as shown by a solid line A in FIG. 3 to reduce the tube current to Ip. Incidentally, Io>Ip>Ic. When the luminous energy becomes a stable level, the INV control circuit 16 puts the tube current to Ic.

Although the luminous energy light is changed in a monotonously increasing fashion as shown by the solid line A in FIG. 3, it is possible as shown by a solid line B of FIG. 3 to temporarily put to a high luminous energy and then gradually lower to a stable luminous energy.

Because the output of the CCD becomes low due to a time taken for the luminous energy in the CCFL 11 to reach a stable region, immediately after starting CCFL 11 lighting, the predetermined luminous energy is lit in an overcurrent state as compared to a tube current for continuous stable lighting. This state is continued in a short time to rapidly increase the tube temperature of the CCFL 11, giving immediate rise to a region that the gas inside the tube is stably lit.

For transition from this state to a tube current in stability, the inverter control circuit 16 monitors the luminous energy variation due to the output of the CCD in order to control the tube current.

On controlling the tube current, an input voltage of the INV 14 may be variably controlled. In addition, a lighting frequency is varied by a frequency variable modulation fashion.

As readily understood from the above description, it is possible for the light source to rise in a brief time to a readable stable luminous energy by controlling the tube current on starting up the CCFL 11.

Figure 4:
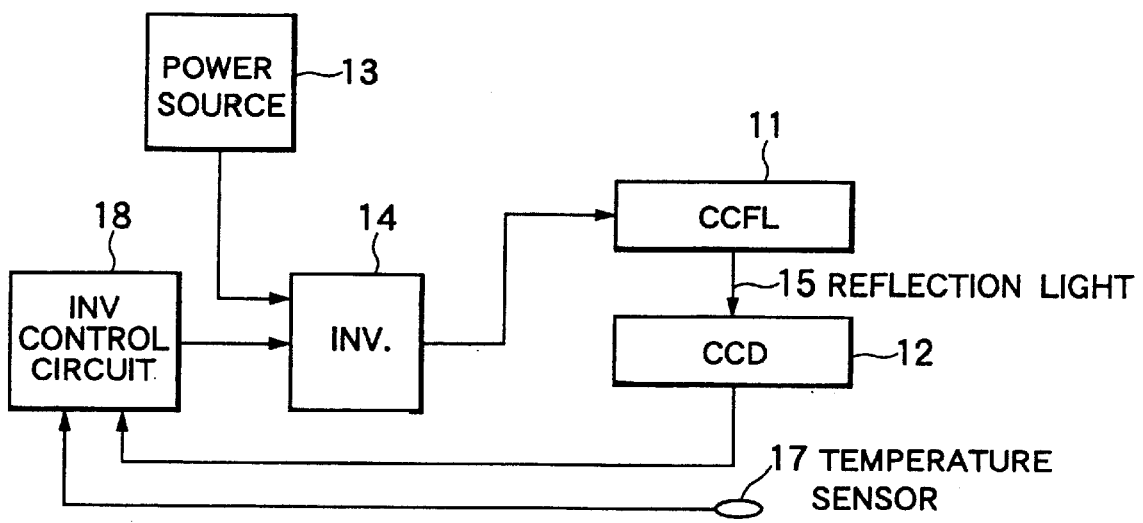
FIG. 4 is a block diagram of a light source control apparatus according to a second embodiment of this invention.

Referring to FIG. 4, description will proceed to a light source control apparatus according to a second embodiment of this invention. In FIG. 4, the same constituent elements are put with the same reference numerals as FIG. 2, omitting descriptions thereof. In the illustrated example, the light source control apparatus further comprises a temperature sensor. The temperature sensor 17 is located at in the vicinity of the CCFL 11. The temperature sensor 17 detects a environmental temperature of the CCFL 11 to supply a detection temperature to the INV control circuit 18. The INV control circuit 18 stores a tube current correction values in correspondence to environmental temperatures, respectively. The INV control circuit 18 obtains a specific one of the tube current correction values on the basis of the detection temperature. The INV control circuit 18 corrects the tube current in accordance with the specific tube current correction value to determine a corrected tube current. The INV control circuit 18 controls the INV 14 to make the INV 14 supply the corrected tube current to the CCFL 11. When the tube current is controlled with respect to a standard temperature as shown in FIG. 3, the tube current shown in FIG. 3 is corrected on the basis of a deviation from the standard temperature. On controlling the tube current, a control step width may be reduced on the basis of the detection temperature.

As described above, it is possible for the light source to rise to the stable luminous energy in a brief time after the light source is put into the on-state because the overcurrent is supplied to the light source immediately after light source is put into the on-state and thereafter the tube current is controlled to a luminous energy stable region.

Furthermore, it is possible to reduce the stand-by consumption power inasmuch as it is unnecessary to use a heater system.

In addition, the image input apparatus does not become expensive when the INV control circuit is used as the light source control apparatus.

What is claimed is:

1. A light source control apparatus for use in an image input apparatus comprising a cold cathode tube light source and a solid imaging device, said image input apparatus reading an image from a document paper by receiving at said solid imaging device a reflected light which is obtained by reflecting a light of said cold cathode light source on said document paper, wherein said light source control apparatus comprises:

a feedback circuit that provides an output of said solid imaging device as a feedback signal; and a current control circuit that regulates a tube current applied to said cold cathode tube light source responsive to said feedback signal, said control circuit being operative to supply current to said cold cathode tube light source at an overcurrent level higher than a predetermined tube current immediately upon said cold cathode tube light source being placed into an on-state without significant time delay, and thereafter at a level responsive to said feedback signal for continuously and stably irradiating said cold cathode tube light source at a predetermined luminous energy.

2. A light source control apparatus as claimed in claim 1, wherein said control circuit reduces said tube current to said predetermined tube current in accordance with said feedback signal after said overcurrent is applied to said cathode tube light source.

3. A light source control apparatus as claimed in claim 2, wherein said control circuit makes said tube current be said predetermined tube current when said control circuit judges that a predetermined luminous energy is obtained in accordance with said feedback signal.

4. A light source control apparatus as claimed in any one of claims 2 and 3, wherein said control circuit comprises:

an inverter for producing said tube current from a power source; and an inverter control circuit for controlling said inverter in accordance with said feedback signal to make said inverter adjust said tube current.

5. A light source control apparatus for use in an image input apparatus comprising a cold cathode tube light source and a solid imaging device, said image input apparatus reading an image from a document paper by receiving at said solid imaging device a reflected light which is obtained by reflecting a light of said cold cathode tube light source on said document paper, wherein said light source control apparatus comprises:

a feedback circuit for providing an output of said solid imaging device as a feedback signal;

a temperature sensor for detecting an environmental temperature of said cold cathode tube light source; and a control circuit for regulating a tube current applied to said cold cathode tube light source based on said detected temperature and said feedback signal.

* * * * *